June 30, 1942.    W. J. MOELLER    2,288,170
THERMAL INSULATING MATERIAL
Filed May 28, 1936    2 Sheets-Sheet 1

INVENTOR.
William J. Moeller
BY Geo. W. Mills, Jr.
ATTORNEY.

Patented June 30, 1942

2,288,170

UNITED STATES PATENT OFFICE 2,288,170

THERMAL INSULATING MATERIAL

William J. Moeller, Mount Healthy, Ohio, assignor to The Philip Carey Manufacturing Company, a corporation of Ohio Application May 28, 1936, Serial No. 82,266

5 Claims. (Cl. 154—45)

This invention relates to a thermal insulating material and comprises a composite or laminated product formed by building up plies of suitable sheet material having indentations and/or raised portions projecting in or out on either or opposite sides from a common plane to provide a plurality of small or minute partially enclosed receptacle-like spaces. The sheet material may in adjacent layers or plies be provided with indentations and/or raised portions of the same or different configuration, size, pattern and the like or the indented sheets may be separated by an intervening plain sheet.

There is provided by my invention an insulating material that has the quality of greatly retarding transmission of heat over heat insulating materials heretofore produced by using plies or layers of sheet material.

In the manufacture of this insulating product, it has been found desirable to cement, by a suitable adhesive, the plies together at spaced apart points. Preferably, although not essential to my invention, the cementing points are staggered by having a cementing point between two layers or plies removed from the point of cementing either of said plies to the next or third ply. This results in greatly increasing the length of the path that heat may flow by conduction, thereby retarding the heat flow and increasing the efficiency of the insulation material. This also tends to increase the stiffness of the covering when made of plies or layers of flexible material, such as asbestos paper and the like. The cementing points may be arranged by applying cement in narrow ribbon-like stripes between two plies and the cement between one of the plies and a third one applied at a different location so as to prevent the adjacent layers of cement being in the same vertical plane or the cement may be applied in spots rather than in ribbon-like stripes. The cement, however, is preferably applied so as to prevent the cement between any two plies or layers being in the same vertical line with cement between one of the plies or layers and a third ply or layer, all for the purpose of increasing as set forth above the line or path of heat conduction. By using sheet material with the small raised or embossed portion alternating with depressed or indented portions, the sheet has a centrally neutral or common plane with projections which when used with other plies or layers of like character, having either the same form of embossed and indented portions or having, to prevent possibility of nesting, a somewhat different form, provides an insulating material of a high degree of efficiency due to the great number of air spaces and the obstructions between adjacent air spaces.

In the preferred form of my invention, I place the indentations in the sheet material, such as asbestos paper or felt, before the paper in its manufacture has dried and set. This may advantageously be done by feeding the sheet of paper between two rolls, one being provided with raised portions and the other being provided with corresponding or registering portions. The paper, being partially moist, is molded to provide the depressed and raised portions after which the paper is dried and the sheet has the desired neutral plane with depressed portions on one side, each of these depressed portions being arranged adjacent to raised portions, and on the opposite surface a similar arrangement is provided except that where on one side of the neutral plane there is a raised portion on the opposite side in the same vertical plane there will be a depressed portion. The depressed portions are each smaller, by thickness of the paper, than each of the raised portions and as a result when two sheets are placed together in direct contact or rolled about a common center there is but a remote chance of the raised portions on one ply nesting within the indented portions of the other ply.

To further preclude any nesting, I have also found that it may be desirable to have adjacent layers or plies in the product provided with indentations and raised portions of different design, form, size or pattern. That is, the indentations and raised portions of one sheet may be spherical, square, triangular, or of any form while the indentations and raised portions of the next adjacent sheet may be of dissimilar design, form, size or pattern.

For a better understanding of the invention reference may be made to the accompanying drawings in which.

Figure 6:
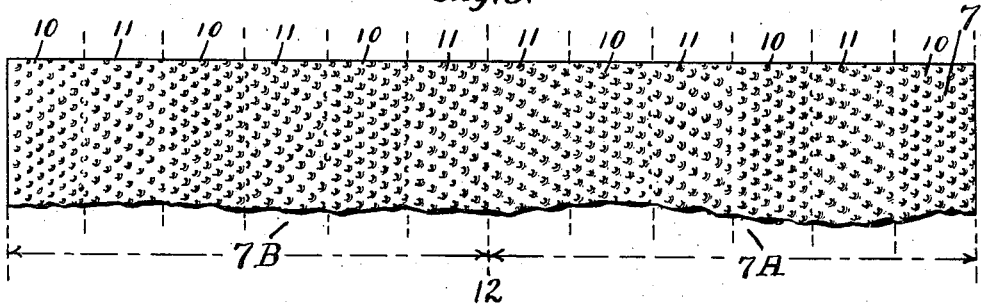
Fig. 6 is a plane view of one side of a sheet showing the indentations and raised portions formed in stripes, with stripes of one pattern alternating with stripes of a different pattern.
Figure 7:
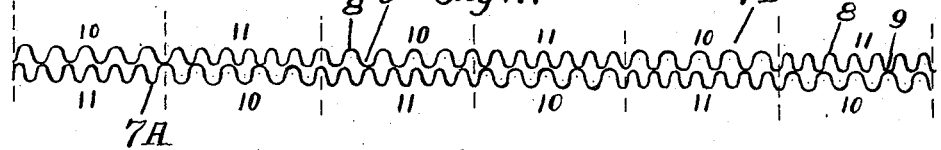
Figure 8:
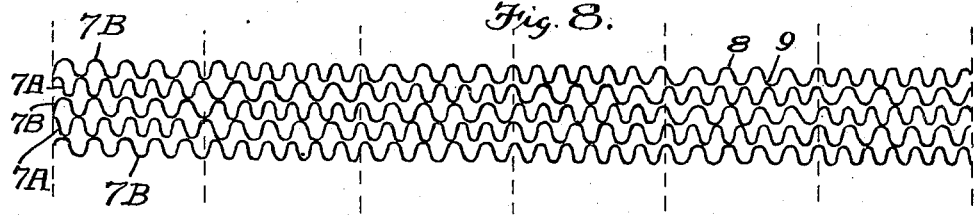

Fig. 7 is an end elevation of a composite insulating product composed of two half sheets formed by bisecting longitudinally the sheet in Fig. 6 and superposing the half sheets with the stripes of different pattern in vertical alinement; and Fig. 8 is an end elevation of a composite insulating product comprised of any number of half sheets cut from a single sheet, or of single sheets superposed in the same manner.

Figure 1:
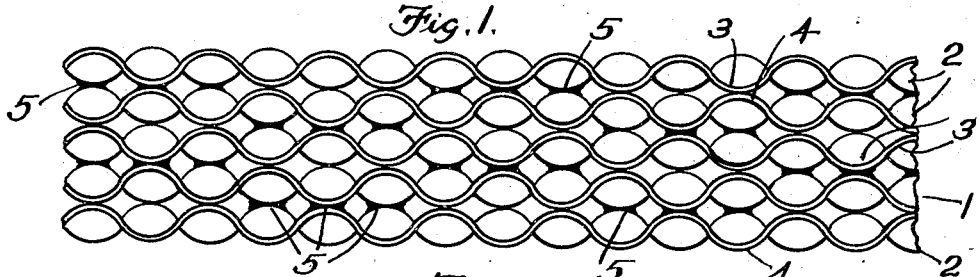
Fig. 1 is an end elevation of a section of a composite insulating product embodying the invention.

Referring to the drawings in which like numerals refer to like parts, numeral 1 (Fig. 1) designates a composite product composed of any number of plies or layers 2 which are molded during their course of manufacture on a paper machine to provide numerous indentations 3 and raised portions 4 disposed transversely and longitudinally on opposite faces. Indentations 3 on one face of ply 2 are directly opposite the raised portions 4 on the other face. The indentations and raised portions are preferably semi-spherical, but may be of any other conformation. With this construction, the plies or layers are of substantially uniform actual thickness through any cross-section portion, but there will be a simulated thickness many times greater than the actual thickness, the simulated thickness being that portion between the two horizontal planes common with the crests or apexes of the raised portions on opposite faces of each ply or layer Throughout all this simulated increased thickness, many minute spaces are provided, each of which is set off by adjacent raised portions. Ordinarily paper is first fabricated with plain flat surfaces, and then if to be corrugated, it is thereafter run between corrugating rolls. This, of course, weakens the sheet and often ruptures same at the crest or base of the corrugations or at any point where force is applied to form the corrugations. However, whether or not the sheet be ruptured at any point where the corrugations are formed, it is weakened in strength and rigidity with those portions of the sheet forming the corrugations compressed more densely than other portions of the sheet. As a result the corrugations are easily pressed back into place with the sheet not only in its original non-corrugated condition, but ruptured, ragged, weakened and flimsy. In the prevent invention the sheet is corrugated as one step of the manufacture in fabricating it, with less stress required in forming the corrugations and without any stress being employed after the sheet has set and dried, and as a result it is substantially uniform in density and rigidity, thereby holding to the corrugated form in which it was made and resisting any force tending to displace any corrugated portion thereof from the original conformation in which it was fabricated. Thus the insulating products produced from plies or layers of these corrugated sheets are preserved and increased in efficiency as to their thermal and insulating qualities, also as to strength and rigidity.

The plies or layers 2 may be secured together by any suitable means. Adhesive means, typified by sodium silicate, is preferred, and this may be advantageously applied between adjacent plies or layers in spaced apart stripes or ribbons 5 with portions intervening between the adhesive ribbons being in non-adhesive contact. These adhesive stripes or ribbons between adjacent plies may advantageously be staggered and not in vertical alinement. This arrangement increases the path and makes it tortuous and winding for the flow of heat therethrough by conduction. Or the adhesive ribbons or stripes may be longitudinally disposed between some of the plies or layers and transversely disposed between others. This effect of interrupting and impeding the heat flow may also be procured by applying the adhesive in spots with intervening spots being left in non-adhesive relation.

Figure 2:
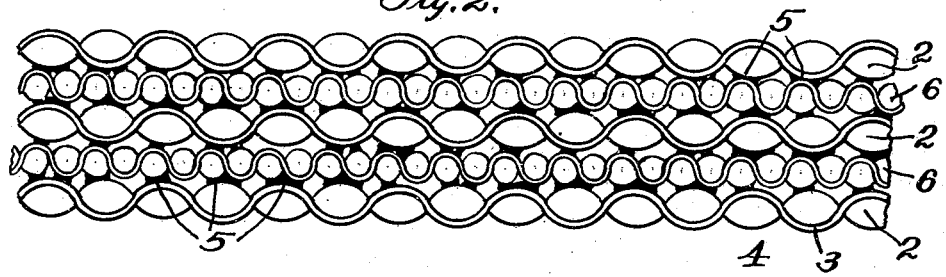
Fig. 2 is an end elevation of a section showing another embodiment of the invention.

The embodiment in Fig. 2 shows a composite insulating product composed of plies or layers corrugated in the manner described above in connection with Fig. 1 but with the adjacent layers or plies differing as to the size of the corrugations. Plies or layers 2 are alternated with other plies or layers 6 having the raised and indented portions smaller in size. This prevents nesting of the plies or layers, and holds the adjacent plies properly spaced at all points of contact, therefore not impairing the insulating qualities of the product. While the plies 2 and 6 have been alternated with plies 2' on the outside to provide the exposed faces, it will be understood that the relative position of these plies or layers could be reversed with the plies 6 on the outside. Or if the composite product were composed of an even number of layers or plies, one exposed side could be a layer or ply 2 and the other exposed side could be a layer or ply 6.

Figure 3:
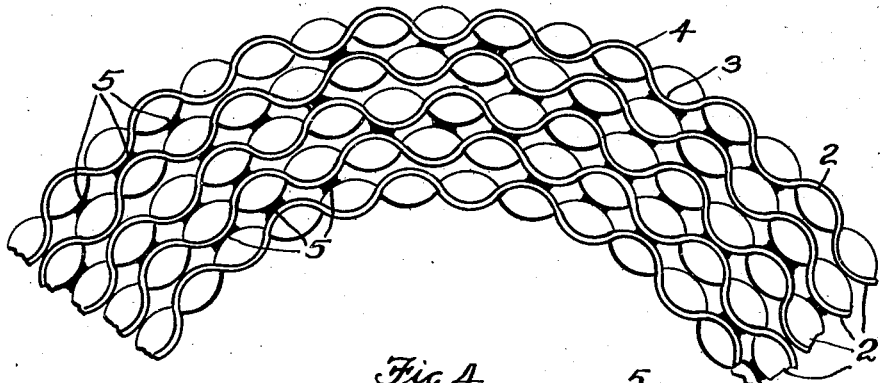
Fig. 3 is an end elevation of a section bent in conformity with a member, such as a pipe, to be covered.

The modification in Fig. 3 shows the product 1 formed to the curvature of a circular pipe so that it may be made in sections for convenient application thereto.

Figure 4:
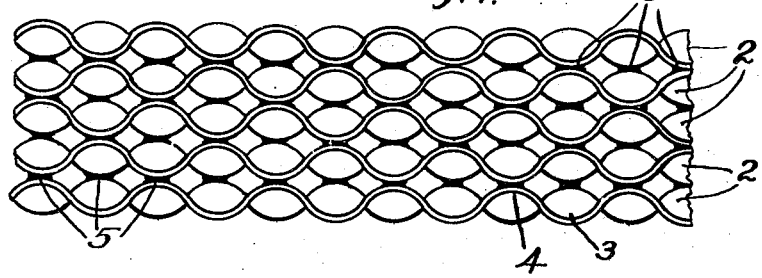
Fig. 4 is an end elevation of a section of an insulating product like that in Fig. 1 but with the adhesive material coextensive with the width of the product.
Figure 5:
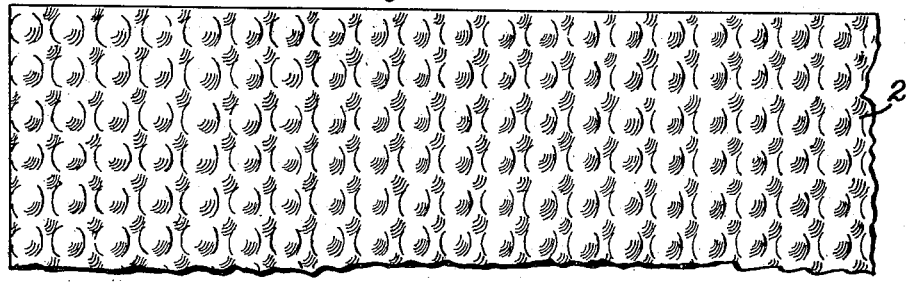
Fig. 5 is a plane view of one side of a sheet formed in accordance with the invention.

In the modification in Fig. 4, the adhesive material 5 is applied to the crests of all the raised portions which are to be brought into contact with another sheet, rather than being applied in spots or ribbons. Accordingly the superposed layers or plies are adhered throughout their entire lengths and breadth at all their points of contact.

The embodiment in Figs. 6 and 7 is typified by a sheet 7 having indentations 8 and raised portions 9 disposed upon the sheet in the form of ribbons or stripes 10 and 11 which differ in pattern and are alternately disposed. The shape or configuration of the indentations and raised portions in the stripe or ribbon 10 may be the same as those in the stripe or ribbon 11 but they are advantageously disposed in different patterns as illustrated in Fig. 6 wherein the diagonal rows of indentations 8 and raised portions 9 in stripe 10 are at an angle to those in stripe 11 rather than parallel with each other. The same result could be obtained by having the indentations and raised portions of stripe 10 different in configuration or size from those in stripe 11. Accordingly when two or more sheets 7 are superposed in layers or plies to build up an insulating product (Fig. 7) stripes 10 of one layer or ply 7 will be in vertical alinement with stripes 11 of the next adjacent layer, and prevent stripes of the same pattern being in vertical alinement. If a product be built up containing more than two indented layers or plies, stripes 10 and 11 will be alternately disposed in vertical alinement. Or an insulating products may be built up by subdividing sheet 7 into sheets of narrow widths, as by splitting the sheet in halves 7—A and 7—B longitudinally on line 12, and then superposing the half 7—A on 7—B with stripes 10 of one half sheet being in vertical alinement with stripes 11 of the next adjacent half sheet. This assures spacing of the superposed plies or layers at all points and prevents any portions of adjacent layers nesting together. While sheet 7 is illustrated as being cut on the longitudinal medial line 12 to provide sheets 7—A and 7—B to be superposed in making relatively wide insulating products, it will be understood that the sheet may be divided into as many subdivisions as there are different ribbons or stripes 10 and 11. In other words, the single sheet 7 could be corrugated with two ribbons of different pattern or design, one of which is ribbon 10 and the other of which ribbon 11, and when the sheet subdivisions were assembled in superposed relation, one ply or layer would have only the design of ribbon 10 thereon and the other of which would have thereon only the design of ribbon 11. This would prevent nesting of adjacent superposed plies in the same way as if there were different designed ribbons on each ply. The same result could also be obtained by having the indentations and raised portions of stripe 10 different in configuration or size from those in stripe 11.

While I have different embodiments typifying the invention and described them in detail, it will be understood that there may be various changes as to details of construction without departing from the spirit of the invention.

I claim:

1. In a heat insulating material, adjacent superposed layers of felted sheet material provided with a portion arranged in a neutral plane and on opposite sides of said neutral plane with a plurality of independent convex portions spaced from each other having the characteristics of having been formed in said felted sheet material during its manufacture but before being dried, concave portions adjacent to said convex portions separating a convex portion from an adjacent convex portion, the exterior of said convex portions being larger than the interior of adjacent concave portion, all so arranged that the convex portions of one layer are opposite to and face the convex portions of the next adjacent layer so as to contact and provide a multiplicity of irregular formed air spaces between said layers, said convex and concave portions of one layer differing in size from the convex and concave portions of the adjacent layer.

2. In a heat insulating material, adjacent superposed layers of felted sheet material provided with a plurality of independent convex portions spaced from each other having the characteristics of having been formed in said felted sheet material during its manufacture but before being dried, concave portions adjacent to said convex portions separating a convex portion from an adjacent convex portion, the exterior of said convex portions being larger than the interior of adjacent concave portion, all so arranged that the convex portions of one layer are opposite to and face the convex portions of the next adjacent layer so as to provide a multiplicity of air spaces between said layers, said convex and concave portions of one layer differing in size from the convex and concave portions of the adjacent layer.

3. In a heat insulating material, adjacent superposed layers of felted sheet material provided with a plurality of independent convex portions spaced from each other having the characteristics of having been formed in said felted sheet material during its manufacture but before being dried, concave portions adjacent to said convex portions separating a convex portion from an adjacent convex portion, the exterior of said convex portions being larger than the interior of adjacent concave portion, all so arranged as to contact and provide a multiplicity of air spaces between said layers, alternate layers having larger convex and concave portions than the layers intermediate said alternate layers.

4. In a heat insulating material, adjacent superposed layers of felted sheet material provided with a plurality of independent convex portions spaced from each other having the characteristics of having been formed in said felted sheet material during its manufacture but before being dried, concave portions adjacent to said convex portions separating a convex portion from an adjacent convex portion, the exterior of said convex portions being larger than the interior of adjacent concave portion, all so arranged as to provide a multiplicity of air spaces between said layers, alternate layers having larger convex and concave portions than the layers intermediate said alternate layers, and means for holding said layers together.

5. In a heat insulating material, adjacent superposed layers of asbestos felted sheet material provided on opposite sides with a plurality of independent convex portions spaced from each other having the characteristics of having been formed in said felted sheet material during its manufacture but before being dried, concave portions adjacent to said convex portions separating a convex portion from an adjacent convex portion, the exterior of said convex portions being larger than the interior of adjacent concave portion, all so arranged that the convex portions of one layer are opposite to and face the convex portions of the next adjacent layer so as to provide a multiplicity of irregular formed air spaces between said layers, said convex and concave portions of one layer differing in size from the convex and concave portions of the adjacent layer.

WILLIAM J. MOELLER.